US 8,064,915 B2

(12) United States Patent
Arduini et al.

(10) Patent No.: US 8,064,915 B2
(45) Date of Patent: Nov. 22, 2011

(54) METHOD FOR PROVIDING TELECOMMUNICATIONS SERVICES, RELATED SYSTEM AND INFORMATION TECHNOLOGY PRODUCT

(75) Inventors: Francesco Arduini, Florence (IT); Sergio Barberis, Turin (IT); Nicola Pio Magnani, Turin (IT); Marco Spini, Turin (IT)

(73) Assignee: Telecom Italia S.p.A., Milan (IT)

( * ) Notice: Subject to any disclaimer, the term of this patent is extended or adjusted under 35 U.S.C. 154(b) by 968 days.

(21) Appl. No.: 10/528,057

(22) PCT Filed: Sep. 11, 2003

(86) PCT No.: PCT/EP03/10114
§ 371 (c)(1),
(2), (4) Date: Mar. 15, 2005

(87) PCT Pub. No.: WO2004/028190
PCT Pub. Date: Apr. 1, 2004

(65) Prior Publication Data
US 2006/0068783 A1   Mar. 30, 2006

(30) Foreign Application Priority Data
Sep. 20, 2002 (IT) ............... TO2002A0824

(51) Int. Cl.
*H04B 7/00* (2006.01)
*H04J 3/06* (2006.01)
*H04W 40/00* (2009.01)
*H04M 1/00* (2006.01)
*H04M 3/42* (2006.01)

(52) U.S. Cl. ............ 455/445; 455/414.1; 455/552.1; 455/553.1; 370/310; 370/350

(58) Field of Classification Search ........ 455/432.1–453, 455/414.1, 464, 552.1–553.14; 370/310, 370/350, 351
See application file for complete search history.

(56) References Cited

U.S. PATENT DOCUMENTS
6,044,091 A * 3/2000 Kim .............................. 370/508
(Continued)

FOREIGN PATENT DOCUMENTS
EP   1 189 405   3/2002
(Continued)

OTHER PUBLICATIONS
Stand-Alone Data-Cells for UMTS by Nortel Networks (3GPP Future Evolution Workshop—Oct. 2001).
(Continued)

*Primary Examiner* — George Eng
*Assistant Examiner* — Wesley Kim
(74) *Attorney, Agent, or Firm* — Banner & Witcoff, Ltd

(57) ABSTRACT

A method for providing telecommunications services in an environment in which a plurality of telecommunications systems operate according to different standards (WLAN, UMTS) and are reachable from a terminal (T) in an integrated manner, wherein at least one of said services can be provided by more systems. Upon the provision request for the above-cited service, the method according to the invention envisages the steps of: —verifying the availability for the provision of the requested service, of at least a first (WLAN) and a second (UMTS) system, and —selecting, in an automatic and dynamic way, one between at least said first (WLAN) and said second (UMTS) system for the provision of the service being requested.

21 Claims, 3 Drawing Sheets

U.S. PATENT DOCUMENTS

| | | |
|---|---|---|
| 6,912,385 B2 | 6/2005 | Namba et al. |
| 7,313,091 B2 * | 12/2007 | Zuniga .......................... 370/229 |
| 7,532,892 B2 * | 5/2009 | Hoglund et al. ........... 455/452.2 |
| 2002/0032024 A1 | 3/2002 | Namba et al. |
| 2002/0085540 A1 * | 7/2002 | Hyvarinen et al. ........... 370/352 |
| 2003/0126263 A1 * | 7/2003 | Fenton et al. ................. 709/226 |
| 2004/0063448 A1 | 4/2004 | Hayashi |

FOREIGN PATENT DOCUMENTS

| | | |
|---|---|---|
| JP | 2002-095045 A | 3/2002 |
| JP | 2002-125255 A | 4/2002 |
| WO | WO 00/70831 | 11/2000 |
| WO | WO 01/50790 | 7/2001 |
| WO | WO 02/054677 | 7/2002 |

OTHER PUBLICATIONS

Location-Based Radio Resource Management . . . by M. Hildebrand et al. (1st Mobile & Wireless Telecommunications Summit, Jun. 2002.

JP Office Action dtd Feb. 12, 2009, JP Appln. 537048-2004.

* cited by examiner

METHOD FOR PROVIDING TELECOMMUNICATIONS SERVICES, RELATED SYSTEM AND INFORMATION TECHNOLOGY PRODUCT

CROSS REFERENCE TO RELATED APPLICATIONS

This application is the US national phase of PCT application PCT/EP2003/010114, filed 11 Sep. 2003, published 1 Apr. 2004 as WO 2004/028190, and claiming the priority of Italian patent application TO2002A000824 itself filed 20 Sep. 2002, whose entire disclosures are herewith incorporated by reference.

FIELD OF THE INVENTION

The present invention concerns the provision of telecommunications services in an environment where at the same time two telecommunications systems working according to different standards are present.

BACKGROUND OF THE INVENTION

As an example—which should however not be regarded as limiting the scope of the invention, that is fully general—the two telecommunications systems may be two mobile communication systems working according to the UMTS (Universal Mobile Telecommunications System) standard and according to a Wireless Local Area Network (WLAN) standard such as for instance the standard currently denoted as 802.11.

In the document titled "Stand-Alone Data-Cells for UMTS", presented as Tdoc FEW-0032/01 paper at the 3GPP Future Evolution Workshop held on Oct. 18-19 2001 at Helsinki (Finland), there is described an architectural solution allowing the implementation of a full integration of both systems; such an integration is performed in the radio mode and offers the possibility of an optimum management of the network.

Closely related topics are discussed in the document "Location-based Radio Resource Management in Multi Standard Wireless Network Environments" by M. Hildebrand, G. Cristache, K. David and F. Fechter presented at the IST Mobile & Wireless Telecommunications Summit 2002, held at Thessaloniki (Greece) on Jun. 17-19, 2002. This document emphasizes among other things the importance of defining solutions aimed at improving the throughput of such systems and providing the user with the best service quality.

OBJECT OF THE INVENTION

The object of the present invention is to provide a solution allowing the optimum exploitation of the opportunities offered by such an integration scenario.

This concerns in particular the possibility of dynamically performing an optimum choice of the access to the integrated system, taking into account the requirements of the network administrator (or of the operator) and of the user that is requesting a service.

SUMMARY OF THE INVENTION

According to the present invention, this object is attained by virtue of a method having the characteristics specifically described in more detail below. The invention also concerns the corresponding system and the related information technology product, that may be directly loaded in the internal memory of a digital computing unit and incorporates portions of software code for performing the steps of the method when the product is run on a computer.

In any case, though the solution according to the invention has been worked out with specific reference to the possible application to an integration scenario such as the one previously described, it can be advantageously applied to any context wherein the same basic topics are faced. Thus the solution according to the invention is applicable to telecommunications networks working according to different standards with regard to those that have been mentioned before or will be specifically mentioned, as well as to contexts wherein the integration is foreseen for a number of telecommunications systems of more than two, working together in an integrated way.

The solution according to the invention makes is therefore possible to provide telecommunications services in an environment wherein:

a plurality of telecommunications systems are foreseen that work according to different standard and are reachable from a terminal in an integrated manner, at least one of the services may be provided by more systems, thus according to different standards.

The solution according to the invention envisages that with regard to the request of provision of the above-mentioned at least one service, there is the availability, for the provision of the service requested, of at least a first and a second system. Then, in an automatic and dynamic manner, a choice is made of one between the two systems for the provision of the service requested. The selection is preferably effected through an unique module, in order to allow the selection, performed in an automatic and dynamic way, of a communication resource regarded as preferential for the provision of the service requested within the integrated system.

BRIEF DESCRIPTION OF THE DRAWING

The invention will now be described by way of a non-limiting example with reference to the appended drawings, wherein.

SPECIFIC DESCRIPTION

Figure 1:
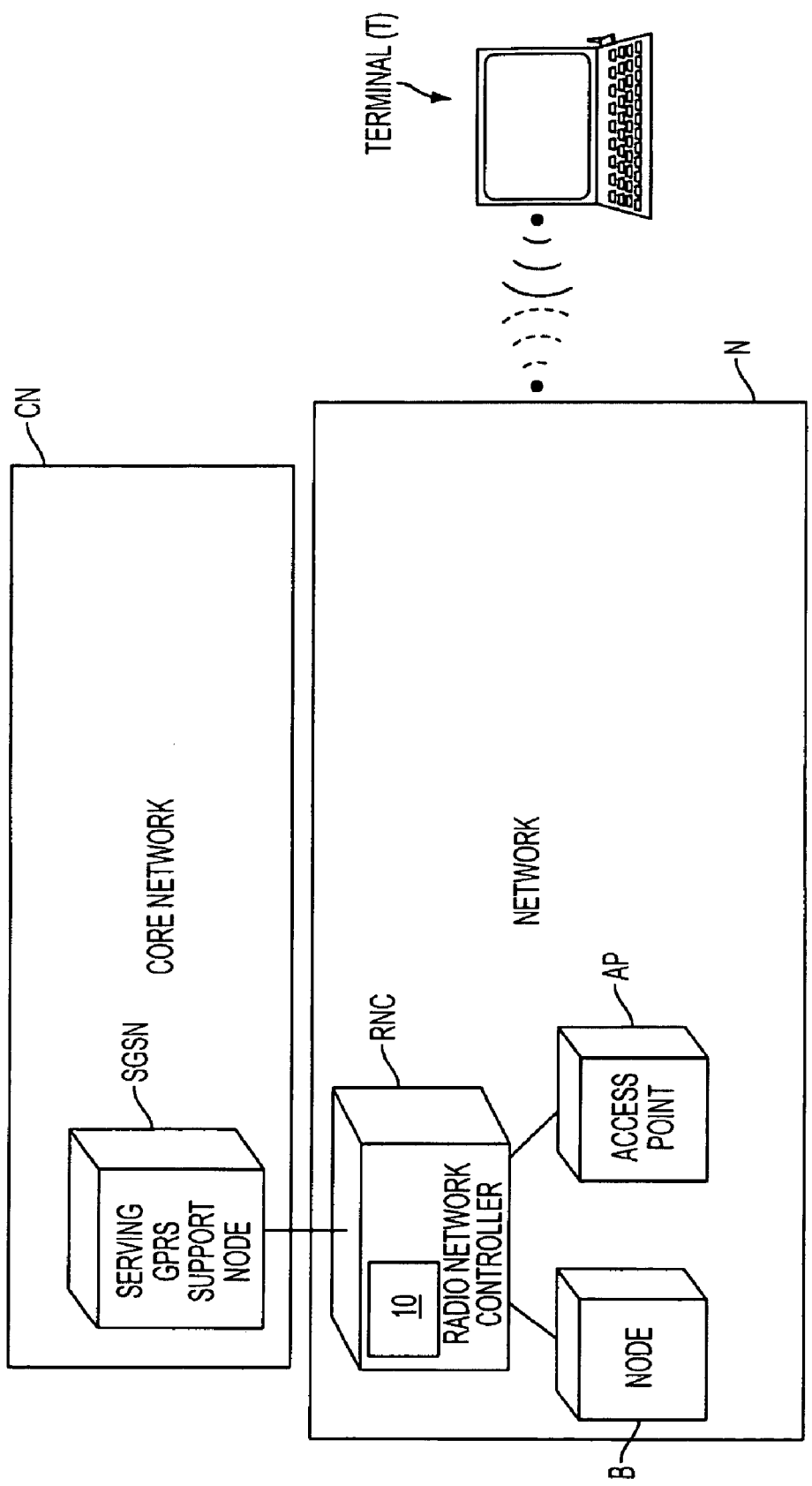
FIG. 1 depicts the general application scenario of the solution according to the invention.

The solution according to the invention has its preferential application in a multi-mode scenario (i.e. a multi-system or multi-standard scenario) of the type represented in the block diagram of FIG. 1.

In principle it is foreseen that the terminals T linked to the system are multi-mode or multi-system terminals, e.g. capable of simultaneously supporting various standards, such as the UMTS and a 802.11 standard.

Such terminals are therefore capable of interfacing:

the node, currently termed as node B, forming the element of the UTRAN (. UMTS Terrestrial Radio Access Network, term indicating the network N of radio access to the UMTS system) suitable for the air transmission of the signal, without any modification with regard to the standard, and the Access Point, AP, i.e. the element of the 802.11 system, designed for the air transmission of the signal.

In the case of the access point AP, the information exchanged with the terminal T is essentially equivalent to the information envisaged in the AP standard mode, being however the possibility foreseen of connection to the so called Radio Network Controller (RNC), which is of standard type, but integrated with the functionalities designed for managing the 802.11 system.

In principle, the access point AP and the controller RNC must communicate with one another two parameters, namely:
the number of users linked to the WLAN network, and
the total bitrate of the active communications on the same WLAN network.

The parameters involved in the procedure are:
SIFS (Short Interframe Space) 28 μs
backoff slot time=50 μs
propagation delay=1 μs
$t_{slot}$=20 μs
CW min (Contention Window min)=32
CW max (Contention Window max)=256

As far as the UMTS network infrastructure is concerned, no modifications are envisaged with regard to the so called Core Network standard, in particular for the node, called SGSN (Serving GPRS Support Node), that interfaces the UTRAN network.

All the above is set in an integration scenario wherein the nodes B and the access points AP are managed preferably by an unique controller, situated in a advanced version of the current controller RNC foreseen by the standards. Further information concerning the specific conventional modalities of implementation in FIG. 1 may be derived from the document presented at the 3 GPP Future Evolutions Workshop already mentioned before and from the 3GPP specifications. The latter comprises all GSM specifications (including GPRS and EDGE) and 3G (third generation) specifications. Other terms used for the description of networks using the 3G specifications are: UTRAN, W-CDMA, UMTS (in Europe) and FOMA (in Japan).

Within the context described herein, the provision is in general envisaged of telecommunications services of different type. To define the basic concepts (though for exemplary purposes only) reference may be made to the standard classification of the services used for the UMTS standard.

In such a context the conversational service is at first dealt with: it is a type or class of service used for real time calls between users, as in the case of voice and video-conference services. The transfer time must be kept low and the time relationship between the various parts of the information flow must remain unchanged, so as to meet the characteristics of the human perception.

Then the streaming services are described for the case in which the user wishes to receive audio/video streams. It is usually a unidirectional service, provided by a server to a terminal, such as a mobile terminal. It is important that the time relations among the various parts of the information stream remain unchanged, being however not foreseen particularly tough requirements on the information transfer times as a whole: the information is also stored at buffer level on the receiving terminal, so as to make any jitter phenomenon transparent to the human perception.

There is then the class of interactive services, that are used whenever the user requests data from a mobile apparatus, as in the case of the Internet navigation or access to a network server. In this case, important factors are the so called Round Trip Delay (RTD) and the data integrity.

There is then the class of background services, that identifies applications with a low priority execution, i.e. likely to be carried out on background. Some examples of services relating to this quality of service or QoS are the transmission of electronic mail messages or the so called SMS's. In such a case the time limits are not important, whilst the data integration is important.

The solution according to the invention aims at best exploiting the opportunities offered by the above-described context. This is made possible through a technique that dynamically carries out a optimum choice of the radio access, taking account of the requirements of the network administrator (or operator) and of the user requesting the service.

The solution described herein envisages to make a choice on the basis of the following parameters:
class of the service requested by the user;
availability of transmission resources (for instance, radio resources at the UMTS side as well as at the WLAN side);
possibility of re-negotiating the service.

The solution under question works according to the following guidelines.

In principle, the UMTS standard has a 2 Mbit/s transmission capacity, whereas the 802.11b standard has a total transmission capacity equal to 11 Mbit/s. The UMTS standard is additionally capable of offering best guarantees in terms of quality of service (QoS).

The UMTS transmission resource may therefore be regarded more valuable, and that justifies the criterion of freeing or reducing as much as possible the load of the UMTS network, in order to exploit it only for services applying tough QoS requirements and in cases in which the WLAN resource is unavailable. For the rest of it, thanks to its high bitrate the 802.11b system offers a best support for the services which do not have particularly tough requirements in terms of QoS.

In practice, the system according to the invention can be implemented in the form of a module 10 (making reference to FIG. 1), integrated in the RNC controller already foreseen within the integration scenario referred to in the introduction of the present invention.

Figure 2:
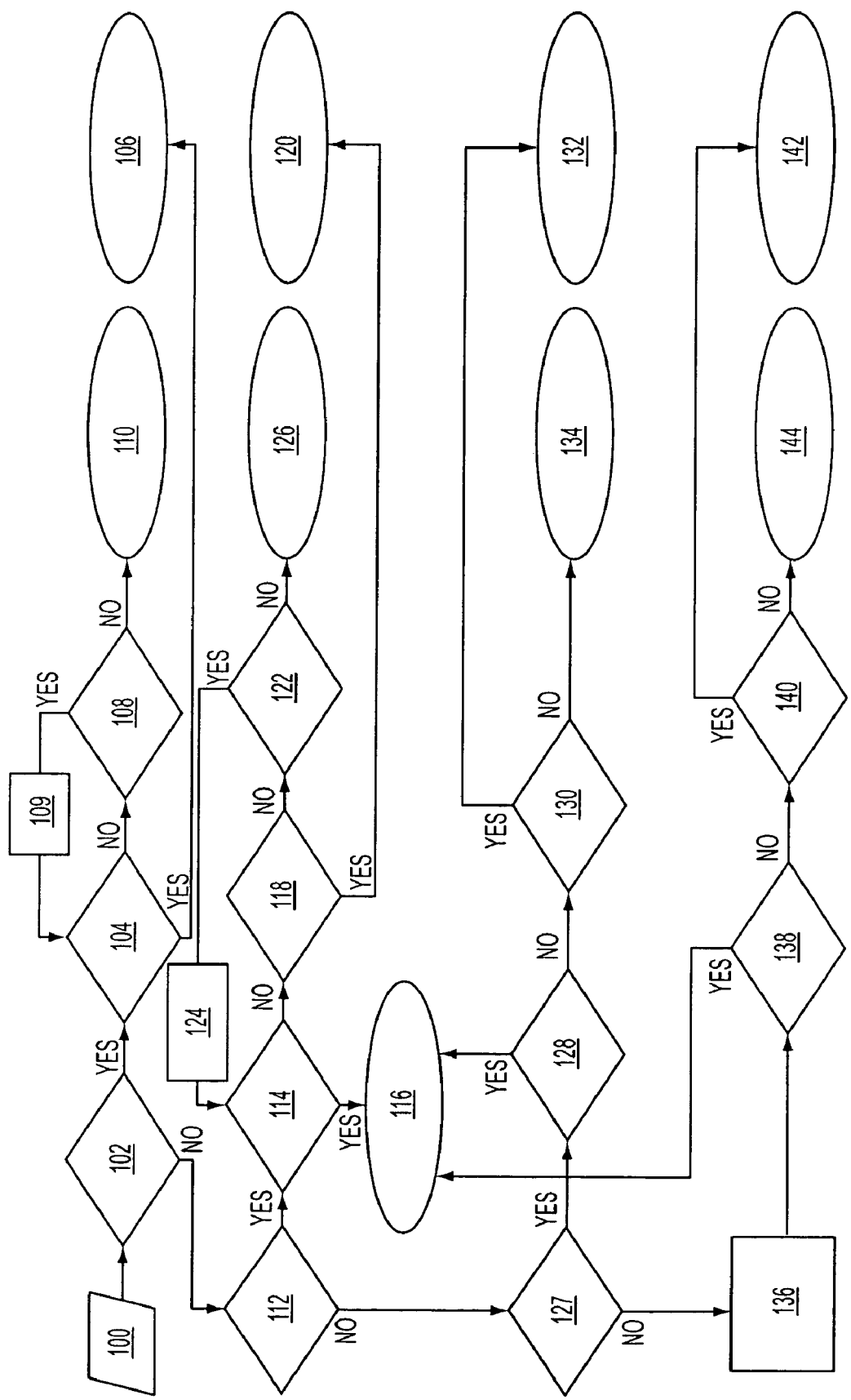
FIG. 2 is a flow chart illustrating the implementation of a solution according to the invention.

La relating method of operation is illustrated in the flow chart of FIG. 2.

In such a flow chart, the step denoted by 100 represents a service request made by the user through the terminal T. The latter action causes the request to the RNC controller of its establishing a so called RAB (Radio Access Bearer) with given characteristics.

The characteristics required for the choice described in the sequel essentially correspond to parameters such as: class of service requested, bit rate and possibility of re-negotiating the service.

At step 102 a check is made on whether the requested service is a service of a conversational type. Since the WLAN standard is not adequate to support conversational services, if the test result of step 102 is positive, the system directly evolves toward the step 104, where a check is made on whether the UMTS communication resource is available. If the test result at step 104 is positive, the system further evolves toward an additional step 106, thus making it possible for the service to be offered on the UMTS system. If the UMTS resource is not available (negative test result of step 104) the system evolves toward a step 108, where a check is made on whether more data rates are required.

In practice, at step 108 a check is made on whether, when the service under question cannot be provided with the characteristics originally requested (for instance, bitrate) the service may be provided with modified characteristics, for instance with a lower bitrate than the one originally foreseen.

If the test result at step 108 is negative, the system evolves toward a step 110, notifying the impossibility of providing the service, that is not offered.

If instead the step 108 test is positive (which states that it possible to start a so called "re-negotiation" of the service, offering it at a lower datarate), the system returns to step 104 through a re-negotiation step 109.

The check on the availability of the UMTS resource is then carried out again, by making reference not to the characteristics of the service so as originally requested, but to the service characteristics resulting from the re-negotiation, for instance with reference to a lower data rate.

The final result of this method of operation is given either by the provision of the service on UMTS (step 106), possibly after executing further attempts under additionally "re-negotiated conditions (should this be possible), or the definite non-provision of the service (step 110).

If at step 102 it has been ascertained that the requested service is not a service of conversational type, the system evolves toward a step 112, where a check is made on whether the requested service is a streaming service.

A service of this kind may be provided through the WLAN resource and the UMTS resource as well, the latter being however regarded (for the reasons already described before) as a more valuable resource.

For this reason, if step 112 yields a negative result, showing that the service requested is a streaming service, the system evolves first toward a step 114, where a check is made on whether the WLAN resource is available.

If the test result of step 114 is negative, the system evolves toward a step denoted by 116, corresponding to the allocation and provision of the service over WLAN with the appropriate data rate.

If instead the test of step 114 gives a negative result (because it is found out that the WLAN resource is not available: the relating verification is effected according to criteria better explained in the sequel) the system verifies, at a subsequent step 118 the system verifies whether instead the UMTS resource is available.

Once the availability of the UMTS resource has been verified (negative outcome of step 118) the system evolves toward a step 120 corresponding to the provision of the streaming service over the UMTS network.

Should the UMTS resource be unavailable (negative outcome of step 118) the system evolves toward a step 122 substantially similar to the step 108, already seen previously.

Step 122 corresponds to a mechanism of possible re-negotiation of the service performed by checking whether the streaming service requested by the user can be provided with different data rates, in particular by making an attempt with a lower data rate.

Such an attempt, represented by step 124, is however performed preferably, instead of returning toward the UMTS resource (step 118), by verifying again (step 114) the availability of the WLAN resource, regarded as less valuable and therefore to be used preferably with regard to the UMTS resource.

Also in this case, as in the case previously seen in relation to the service of conversational type, the final outcome of the procedure is either the service provision over UMTS (after one or more attempts made with lower data rates-step 116) or the final notification, represented by step 126, of the impossibility of offering the service.

Substantially similar criteria (without the possibility of service re-negotiation) are adopted for the provision of services of interactive or background type.

In particular upon a negative outcome of step 112 (the service requested is neither of conversational nor of streaming type) the system evolves toward a further selection step 127, wherein a check is made on whether the service being requested is an interactive service.

In the case of a positive outcome, once again the systems verifies, at a step 128, the availability of the WLAN resource.

If such a resource is available (positive outcome of step 128), the service is allocated over WLAN with the appropriate data rate (step 116).

If step 128 indicates the unavailability of the resource, the system evolves toward a step 130, where the availability of the UMTS resource is verified.

In case of positive outcome, the system evolves toward a step 132, corresponding to the provision of the interactive service via UMTS. Should step 130 have instead a negative outcome, indicating the unavailability of the UMTS resource, the system will directly evolve toward a step 134 corresponding to the non-provision of the service. This is due to the fact that for the service of interactive type it is usually unlikely to suggest the execution of re-negotiation attempts with lower data-rates.

The possible negative outcome of the step denoted by 127, indicating that the service requested is neither of conversational nor of streaming class, and nor of interactive class, identifies the requested service as background service.

Once this fact has been ascertained at a step denoted by 136, the system evolves again toward a step 138 for checking the availability of the WLAN resource.

In the case of a positive outcome, the service is allocated over the WLAN network, identified as available.

This occurs at the step denoted 116.

If instead step 138 gives a negative outcome indicating the unavailability of the WLAN resource, the system evolves toward a step 140, where a check is made on the availability of the UMTS resource.

According to criteria basically similar to those adopted at steps 130, 123, 134, described before, the outcome of step 140 leads as an alternative either to the service provision over UMTS (step 142) or to the notification of the impossibility of offering the service (step 144).

In short, the operation criteria described above may be traced back to the following general flow chart.

At first a check is made of the class of the service requested.

The WLAN standard is rather unsuitable to support services of conversational type, thus this type of services is immediately routed to the UMTS network.

Once the check has been made and it has been ascertained that the requested service is not of conversational type, the system verifies whether or not the WLAN resource is available, by making a kind of Admission Control.

In practice, a check is made to verify that the addressing of the user over the WLAN does not excessively load the network, thus causing an unacceptable degradation of the overall system performance.

If the WLAN resource is available, the service is allocated over such radio access, and the procedure ends.

If the WLAN resource is not available (or the check performed at the start has given a positive result notifying the request of service of conversational type), then a check is made on the availability of the UMTS resource through a procedure of Admission Control (already envisaged with the UMTS system and implemented through the RNC controller).

If the UMTS resource is available, the service is allocated over such a radio access, and the procedure ends.

Is the UMTS resource unavailable, then the mechanism is exploited for re-negotiating the service (only in the case of conversational services or streaming) and the attempt is repeated through the procedure with lower service requirements.

The procedure ends in any case after a new check of the resources. If the service could be provided with lower resources, and such resources are available, the service is provided; otherwise no service provision occurs.

In the case wherein no radio resources are available for the conversational or streaming services, it is possible to re-negotiate the service and meet the request by supplying a lower data-rate as compared to the one initially requested.

The attempt with a lower data-rate (steps 109 and 124) essentially corresponds to check whether it is possible to lower the data-rate requests, by trying to control again the resource with a lower rate.

To ascertain the requested service among the various classes, a check procedure is envisaged at steps 102,112 and 127 on the basis of the definitions given before.

The service allocation over WLAN or UMTS corresponds to the fact that the relating check on the resource has given a positive outcome, and the service is provided through the radio access or the 802.11b or UMTS standards.

The service is not offered when the procedures end without the possibility of providing the requested service because no radio resources are available to meet the service requirements.

With regard to the availability verification of the resources, in the case of the UMTS resource it is possible to perform the verification by means of the formula (commonly known as such) derived from the definition of the so called "pole capacity". In the "uplink" case, such a formula is then $$\eta = (l+f)*SNR*SAF$$

Such a formula corresponds to the definition of the η parameter, identifying the cell load, standardized with regard to the max theoretical value, For example, it is possible to take into account a loaded cell, when this parameter is equal to 0.7.

By f a parameter is meant that takes account of the interference contribution caused by the cells adjacent to the cell under question.

SNR stands for the signal-to-noise ratio required, i.e. the ratio signal to noise necessary in order that a given service is well supported.

Eventually, the parameter denoted by SAF (Service Activity Factor) indicates the average time slot during which the source is active.

The above formula makes reference to an individual customer. The total value is obtained by computing the partial value of the parameter (i.e. calculating its value for each active connection) and summing up all the terms thus obtained. This formula supplies an approximate estimation of the network load and can therefore be used to schematize the behavior of the admission control and thereby to obtain the answer to the question about the available UMTS resource.

The solution just described is a purposely simplified example of control admission technique. In general the admission control techniques are more sophisticated since they take into account for instance the load on the down-link connection and the availability of spreading codes in addition to the exploitation of information derived from power measurements.

With regard to the access to the WLAN network, a particularly advantageous solution is the one which describes the performance degradation of the system as the number of users increases. This makes it possible to provide a kind of admission control criterion by deriving the capacity of the 802.11 standard as a function of the number of active users. The diagram of FIG. 3, obtained from the processing of the parameters already mentioned before (i.e. Short Interframe Space, backoff time, propagation delay, slot time, min. and max Contention Window), represents the rate value standardized to the value of the max theoretical bit rate, equal for example to 11 Mbit/s for the 802.11b system, as a function of the number of users.

In other terms, if the active users on the WLAN are for instance 30, these users will have at their disposal (making reference to the diagram of FIG. 3) a total of about 6,457 Mbit/s, which are then subdivided among all the users.

It is therefore possible to check whether the bit rate totally available is sufficient to provide the service requested by all the users.

As a practical example (making jointly reference to the flow chart of FIG. 2 and to the diagram of FIG. 3) we consider the case of a users request for a streaming service with a 384 kbit/s that can be met also with a 144 kbit/s bit rate.

Assuming that at the moment 32 users are active on the WLAN (thus the available bit rate is equal, with reference to the FIG. 3 diagram, to 6,3349 Mbit/s) and the load of the UMTS cell is assumed to be close to the max. value of 0.7. The system is therefore close to the maximum load condition.

Figure 3:
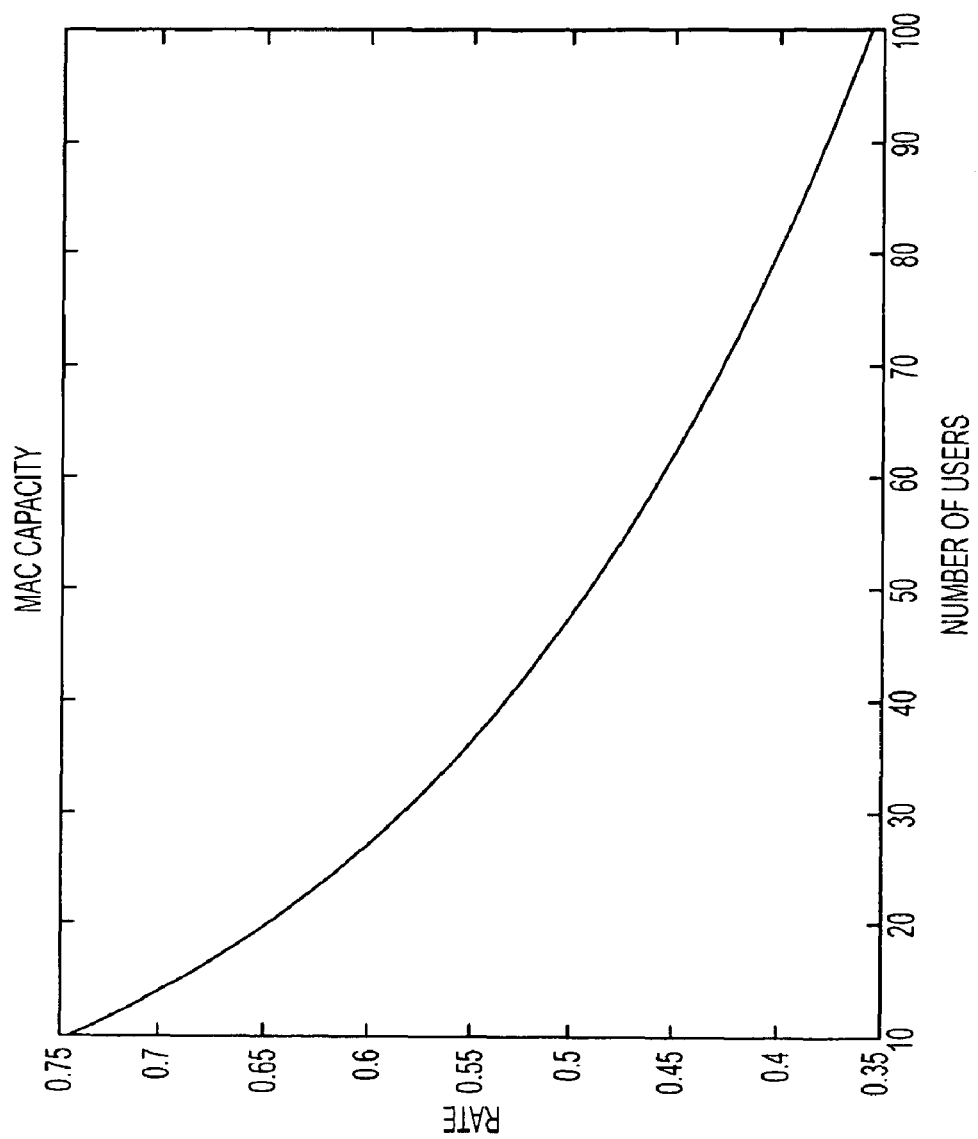
FIG. 3 is a diagram to be used for the evaluation of the load conditions of a WLAN network or a similar network in the context of the invention.

The evolution through the flow chart of FIG. 3 is therefore the following.

Is the service of a conversational type? No.

Is it a streaming service? Yes.

The question is now whether the WLAN resource is available or not.

Assume that, over the WLAN, 32 users are connected (max bit rate available 0.5759*11=6.349 Mbit/s) and that the load on such a network is equal to 6,000 Mbit/s. The thirty-third user needs, as specified before, a 384 kbit/s streaming service which can be met also with a 144 kbit/s bit rate.

The control that has been effected is the following.

The new bit rate available is 0.5706*11=6.2766 Mbit/s. Adding to the load value the bitrate of the request of the new user one obtains the value 6,000+384=6,384 Mbit/s, which exceeds the availability.

Is the WLAN resource available? No.

The UMTS cell is close to the value of max. load, therefore the request cannot be met by the UMTS either.

The UMTS resource is available? No.

A question then arises: Is it possible to re-negotiate the service? Yes.

The attempt is made now with 144 kbit/s, and the control effected envisages to sum up to the load data the bit-rate of the (second) request, and this brings to the value of 6,000+144=6, 144, Mbit/s, so that the availability is not exceeded.

We ask then again:

Is the WLAN resource available?

The question receives this time a positive answer (Yes). The service is then allocated on the WLAN network with the appropriate data-rate modified, i.e. reduced as compared to the data-rate initially requested.

A similar criterion can be followed for the other WLAN systems wherein use is made of numerical values typical for them, without affecting at all the decision process herein described.

Obviously, keeping unchanged the principle of the invention, the details of implementation and the forms of embodiment may be widely varied, with respect to what has been described and illustrated herein, thus without leaving the scope and the spirit of the present invention.

In particular it will be appreciated i in at least a few application cases—one or more of the sets or sub-sets mentioned in the claims that follow, actually correspond to the empty set.

Further it is evident that the characteristic "deliverable" (i.e. available) or "not deliverable" (i.e. unavailable), ascribed to a given service with a view to its possible provision through a given system, must not be meant in a absolute physical sense and must be instead reasonably referred to the possibility of providing a given service under the conditions and with a quality level that are acceptable to the users.

The invention claimed is:

1. A method for the provision of telecommunications services in an environment in which there are a plurality of systems working according to different standards and reachable from a terminal in an integrated way, at least one of the telecommunications services being provided by several systems of the plurality, the method, with regard to the request of provision of the at least one telecommunication service, comprising the steps of:
   verifying the availability for the provision of the requested telecommunication service of at least a first and a second system of the plurality, the first telecommunication system forming with respect to the second telecommunication system a resource to be exploited in a preferential way, and
   exploiting the resource in the preferential way by selecting, in an automatic and dynamic way, at least one of the first and the second system of the plurality for the provisioning of the requested telecommunication service by subdividing the telecommunication services into
      a first set of telecommunication services to be substantially provided through the second telecommunication system, wherein the first set of telecommunication services comprises services of a conversational class, and
      a second set of telecommunication services to be provided through the first telecommunication system and the second telecommunication system,
   responsive to a request for a provision of a telecommunication service of the first set, verifying the availability of the second telecommunication system for providing the telecommunication service of the first set, supplying or not supplying, respectively, the telecommunication service of the first set through the second telecommunication system, depending on whether the second telecommunication system is available,
   responsive to a request for a provision of a telecommunication service of the second set, verifying the availability of the first telecommunication system for providing the telecommunication service of the second set, and providing the telecommunication service of the second set through the first telecommunication system when the first telecommunication system is available, and
      when the first telecommunication system is unavailable for transmission of the telecommunication service of the second set, verifying the availability of the second telecommunication system to provide the telecommunication service of the second set and providing or not providing the telecommunication service of the second set, as requested, depending on whether the second telecommunication system is available for provision of the telecommunication service of the second set,
   wherein the first telecommunication system is not configured to satisfy the initial Quality of Service (QoS) levels of the first set of telecommunication services,
   wherein the second telecommunication system is configured to satisfy the initial QoS levels of the first set of telecommunication services,
   wherein the first telecommunication system is configured to transmit more bits per second as compared to the second telecommunication system, and
   detecting the availability of the second telecommunication system by defining a load parameter of the second telecommunication system and by considering the second telecommunication system as unavailable when the load parameter reaches a threshold value, wherein the load parameter is based on uplink load as a function of an interference contribution, signal to noise ratio, and a service activity factor.

2. The method as recited in claim 1 wherein the selecting step is carried out so as to find, within the first set, a subset of telecommunication services that is available to be provided in at least a condition of modified communication resources, the presence of a provision request for a telecommunication service of the subset including the steps of:
   verifying the unavailability of the second telecommunication system for the provision of the telecommunication service of the subset as requested and,
   once the unavailability has been verified, re-negotiating the provision request whereby the telecommunication service of the subset is again requested for the provision in a condition of modified communication resources.

3. The method as recited in claim 2 wherein the selecting step is carried out so as to lead, within the second set, to a respective subset of telecommunication services that are deliverable in at least one condition of modified communication resources, and, when there is a provision request for a telecommunication service of the respective subset, the selecting step comprises the steps of:
   verifying the unavailability of at least one between the first and the second system for the provision of the telecommunication service of the respective subset as requested and,
   after verifying the unavailability, re-negotiating the provision request, the provision of the telecommunication service of the respective subset being requested again in a condition of modified communication resources.

4. The method as recited in claim 3 wherein the selecting step is carried out so as to be able to lead, within at least one between the set and the respective subset, to telecommunication services that are available to be provided under a plurality of conditions of modified communication resources, the method further comprising the step of:
   repeatedly re-negotiating the request for service provision under subsequently modified communication resources.

5. The method as recited in claim 3 wherein the second set includes streaming class services.

6. The method as recited in claim 1 wherein the second set comprises services included in at least one class among the classes of streaming services, interactive services, and background services.

7. The method as recited in claim 1 wherein the selecting step is carried out by selecting the systems in the group formed by the mobile communication systems.

8. The method as recited in claim 7 wherein the selecting step is carried out by selecting the systems in the group formed by UMTS, WLAN and 802.11 systems.

9. The method as recited in claim 1, further comprising the step of:
   verifying the availability of the first telecommunication system on the basis of a criterion of admission control of the users by detecting the performance degradation of the first telecommunication system as the number of users increases.

10. The method as recited in claim 9, further comprising the steps of:
   detecting the total bit rate available to the active users on the first telecommunication system, and
   considering the first telecommunication system as unavailable for a new user when the bit rate available upon the possible admission of the new user reaches a threshold value.

11. A system for providing telecommunications services in an environment wherein a plurality of telecommunications systems are provided that operate according to different standards and that are configured to be accessed from a terminal in an integrated manner, at least one of the telecommunication services being deliverable by more than one of the telecommunications systems of the plurality, the system being configured, when there is a provision request for the at least one telecommunication service, to cooperate with the plurality of telecommunications systems and comprising:
   a processor; and
   a memory having stored thereon instructions that, when executed by the processor, perform:
      verifying the availability for the provision of the telecommunication service requested, of at least a first and a second system of the plurality of telecommunications systems, and
      selecting, in an automatic and dynamic way, between the first and the second system of the plurality for the provision of the telecommunication service requested, the first system forming with respect the second system a resource to be exploited preferentially, the selecting including
      a) subdividing the telecommunication services into
         a first set of telecommunication services to be substantially provided through the second telecommunication system, wherein the first set of telecommunication services comprises services of a conversational class, and
         a second set of telecommunication services to be provided through the first telecommunication system and the second telecommunication system,
      b) verifying the availability of the second telecommunication system for providing the telecommunication service of the first set as requested, supplying or not supplying respectively the telecommunication service of the first set through the second telecommunication system, depending on whether the second telecommunication system is available,
      c) when a request for provision of a telecommunication service of the second set is received,
         c1) verifying the availability of the first telecommunication system in order to provide the telecommunication service of the second set and providing the telecommunication service of the second set through the first telecommunication system when the first telecommunication system is available,
         c2) when the first telecommunication system is unavailable for transmission of the telecommunication service of the second set, verifying the availability of the second telecommunication system to provide the telecommunication service of the second set and providing or not providing the telecommunication service of the second set depending on whether the second telecommunication system is available for provision of the telecommunication service of the second set,
   wherein the first telecommunication system is not configured to satisfy the initial Quality of Service (QoS) levels of the first set of telecommunication services,
   wherein the second telecommunication system is configured to satisfy the initial QoS levels of the first set of telecommunication services,
   wherein the first telecommunication system is configured to transmit more bits per second as compared to the second telecommunication system, and
   detecting the availability of the second telecommunication system by defining a load parameter of the second telecommunication system and by considering the second telecommunication system as unavailable when the load parameter reaches a threshold value, wherein the load parameter is based on uplink load as a function of an interference contribution, signal to noise ratio, and a service activity factor.

12. The system as recited in claim 11 wherein the instructions, when executed by the processor, further perform:
   determining the presence, within the first set, of a subset of telecommunication services deliverable in at least a condition of reduced communication resources, and,
   when receiving a provision request of a telecommunication service of the subset, verifying the unavailability of the second telecommunication system for the provision of the telecommunication service of the subset as requested, and, once the unavailability has been verified, re-negotiating the provision request, the telecommunication service of the subset being requested again for the provision in a condition of reduced communication resources.

13. The system as recited in claim 11, wherein the instructions, when executed by the processor, further perform:
   determining, within the second set of telecommunication services, a respective subset of telecommunication services configured to be provided in at least a condition of reduced communication resources, and
   when receiving a provision request for a telecommunication service of the respective subset, verifying the unavailability of at least one between the first and second system for the provision of the telecommunication service of the respective subset as requested and, once the unavailability has been verified, re-negotiating the provision request such that provision of the telecommunication service of the respective subset is requested again in a condition of reduced communication resources.

14. The system as recited in claim 13, wherein the instructions, when executed by the processor, further perform:
   providing at least one of the set and the respective subset of telecommunication services in a plurality of conditions of modified communication resources, and
   repeatedly re-negotiating the request for telecommunication service provision under conditions of subsequently modified communication resources.

15. The system as recited in claim 13, wherein the services of the second set are services of a streaming class.

16. The system as recited in claim 11, wherein the second set of telecommunication services comprises telecommunication services included in at least one class among the classes of the streaming services, interactive services, and background services.

17. The system as recited in claim 11, wherein the system is configured to co-operate with mobile communication systems, including the telecommunications systems of the plurality.

18. The system as recited in claim 17, wherein the system is configured to co-operate with telecommunications systems included in the group formed by UMTS, WLAN and 802.11 systems.

19. The system as recited in claim 11, wherein the step of verifying the availability of the first telecommunication system comprises verifying the availability of the first telecommunication system on the basis of a criterion of admission control of users thereof by detecting performance degradation of the first telecommunication system as the number of users increases.

20. The system as recited in claim 19, wherein the instructions, when executed by the processor, further perform:
   detecting a total bit rate available to users active on the first telecommunication system, and
   considering the first telecommunication system unavailable for a new user when the bit rate available following the possible admission of the new user reaches a threshold value.

21. A non-transitory computer-readable medium having stored thereon instructions that, when executed, perform:
   verifying the availability for the provision of a requested telecommunication service of at least a first and a second system, of a plurality of telecommunication systems, the first telecommunication system forming with respect to the second telecommunication system a resource to be exploited in a preferential way, and
   exploiting the resource in the preferential way by selecting, in an automatic and dynamic way, at least one between the first and the second system of the plurality for the provision of the requested telecommunication service by subdividing the telecommunication services into
      a first set of telecommunication services to be substantially provided through the second telecommunication system, wherein the first set of telecommunication services comprises services of a conversational class, and
      a second set of telecommunication services to be provided through the first telecommunication system and the second telecommunication system,
   responsive to a request for provision of a telecommunication service from the first set, verifying the availability of the second telecommunication system for providing the telecommunication service of the first set, supplying and not supplying respectively the telecommunication service of the first set through the second telecommunication system, depending on whether or not the second telecommunication system is available,
   responsive to a request for provision of a telecommunication service of the second set,
      verifying the availability of the first telecommunication system in order to provide the telecommunication service of the second set and providing the telecommunication service of the second set through the first telecommunication system when the first telecommunication system is available,
      when the first telecommunication system is unavailable for transmission of the telecommunication service of the second set, verifying the availability of the second telecommunication system to provide the telecommunication service of the second set and providing or not providing the telecommunication service of the second set depending on whether the second telecommunication system is available for provision of the telecommunication service of the second set, as requested,
   wherein the first telecommunication system is not configured to satisfy the initial Quality of Service (QoS) levels of the first set of telecommunication services,
   wherein the second telecommunication system is configured to satisfy the initial QoS levels of the first set of telecommunication services,
   wherein the first telecommunication system is configured to transmit more bits per second as compared to the second telecommunication system, and
   detecting the availability of the second telecommunication system by defining a load parameter of the second telecommunication system and by considering the second telecommunication system as unavailable when the load parameter reaches a threshold value, wherein the load parameter is based on uplink load as a function of an interference contribution, signal to noise ratio, and a service activity factor.

* * * * *